INVENTOR:
L. P. REISS

United States Patent Office 3,514,217
Patented May 26, 1970

3,514,217
METHOD OF CONTROLLING PIPELINE SLURRIES
L. Philip Reiss, Houston, Tex., assignor to Shell Oil Company, New York, N.Y., a corporation of Delaware
Filed Feb. 23, 1968, Ser. No. 707,776
Int. Cl. F04b 49/00
U.S. Cl. 103—35                                  3 Claims

ABSTRACT OF THE DISCLOSURE

A method of controlling the flow of a slurry through a pipeline at a velocity greater than a critical velocity below which solids settle on the bottom. It consists of measuring the spatial concentration and the transport concentration of the slurry, generating an error signal proportional to the difference of the spatial concentration and transport concentration measurements, and controlling a critical parameter such as slurry velocity with the error signal.

BACKGROUND OF THE INVENTION

This invention relates to the transportation of solids in slurry form through pipelines. More particularly, it relates to a method of controlling the slurry velocity so as to minimize power consumption and at the same time maintain a stable flow.

When transporting solids as a slurry in a pipeline, the flow velocity of the slurry must be maintained above some critical value, $V_c$, in order to fully suspend the solid. If the flow velocity falls below the critical velocity, solids will settle on the bottom of the pipe. This is known is unstable slurry flow and may result in the pipeline becoming plugged with all the expense and loss of time associated therewith. A prime objective therefore must be the prevention of pipeline plugging.

However, it has also been found that minimum power to move a given amount of solids via a slurry pipeline occurs near the critical velocity. And since it is also desirable to operate a pipeline at or near its minimum power consumption rate, it becomes desirable to accurately know the critical velocity and to operate the pipeline at a velocity only slightly above the critical velocity.

The critical velocity depends on many variables affecting slurry pipeline operation. For example, particle size of the solid, density of the solid, and concentration of the solid; density and viscosity of the liquid; and pipeline diameter all influence the critical velocity. All of these variables except pipeline diameter could change with time during pipeline operation. Particle size could vary due to changes in solid grinding conditions. Solid density could vary as solid from different origin, for example veins or seams in a particular mine, are supplied to the pipeline. Liquid density could vary due to the dissolved solids' content and temperature of the liquid is water; or if the liquid is oil or the like, density could vary due to different origins and/or temperature changes. Therefore a control system is necessary that is capable of continuously measuring and controlling critical parameters of the slurry such as slurry velocity.

SUMMARY OF THE INVENTION

It is therefore an object of this invention to provide a method for minimizing the power consumption in the stable transport of a slurry through a pipeline.

Another object is to provide a method for continuously measuring and controlling a pipeline slurry velocity to a critical value.

A further object is to provide a method for controlling the solids' concentration of the slurry fed to the pipeline in response to changes in slurry transport concentration.

These and other objects of the invention are achieved by a method that broadly includes measuring the spatial concentration of the slurry, measuring the transport concentration slurry, generating an error signal proportional to the difference in the spatial and transportation concentration, and applying the error signal to the pipeline pumps or other controlling apparatus such as a solids feeder to control critical parameters of the slurry.

In order to fully understand the present invention, it is necessary to define two properties of solid transport, spatial concentration and transport concentration. Spatial concentration is defined as the volume of solids existing at any time in any differential length of a pipeline divided by the total volume of the differential length of the pipeline. The transport concentration, on the other hand, is defined as the volume of solids transported per unit time through a cross-section of the pipeline taken perpendicular to the pipeline axis, divided by the total volume transported per unit time through this cross-section. When the pipeline velocity falls below the critical velocity, solids will be held up as a slow-moving or stationary bed; and the spatial concentration will be greater than the transport concentration. However, when the spatial concentration is equal to the transport concentration, there is no solid buildup; that is, the flow is homogeneous.

To measure spatial concentration, a densitometer is located at a horizontal position on the pipeline away from disturbances due to bends, fittings, or pumps. The spatial concentration follows directly from measurements of slurry density.

To measure transport concentration, the densitometer must be located on the pipeline at a point where the flow is known to be completely homogeneous. Under these conditions, the spatial concentration is equal to the transport concentration. These conditions will most likely occur at the discharge of a pump and preferably in a vertical pipe run.

The output from the densitometers can be compared using a conventional differential amplifier and the difference signal may be used to stimulate a conventional motor speed control device. As one densitometer may be located some distance from the pump station to measure an undisturbed spatial concentration, telemetering equipment may be used to send the spatial concentration signal to the pumping station where the densitometer measuring transport concentration is located.

Figure 1:
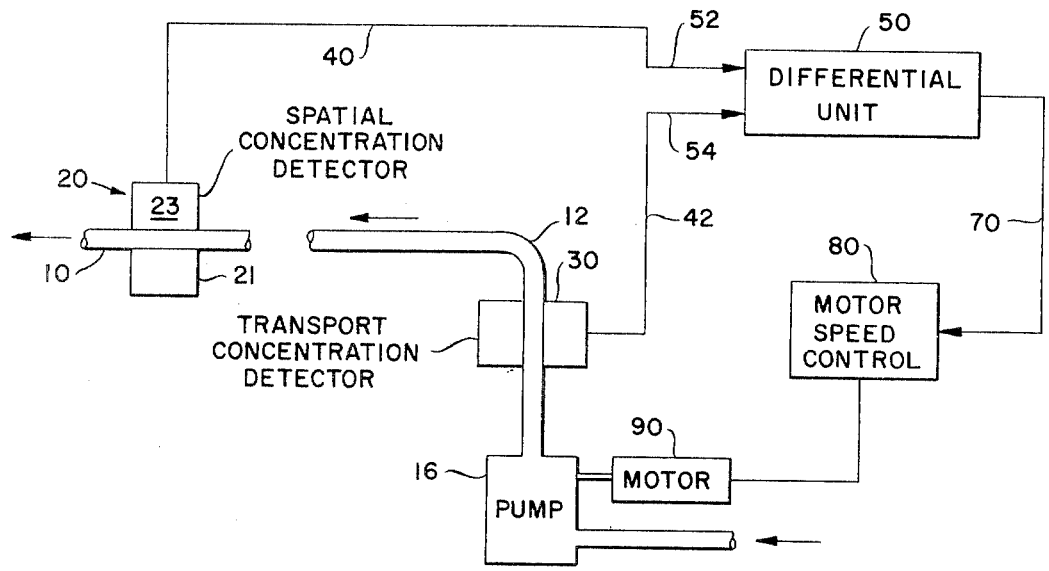
FIG. 1 illustrates one embodiment of the invention based on control of the slurry velocity.

Referring now to FIG. 1, a pipeline 10 is shown making a horizontal run until it reaches corner 12 at which point it makes a 90° turn and runs vertically into pump 16. Somewhere on the horizontal run of pipe 10, at a large distance from any flow disturbance, is located a spatial concentration detector 20. Spatial concentration detector 20 is made up of the following components.

A source of gamma radiation such as Cesium 137 is located on outside the pipe on one side of the pipe and a gamma radiation detector is located outside the pipe directly across the pipe. The beam of gamma radiation penetrates the pipe wall, the slurry in the pipeline and the other pipe wall and finally is detected by the radiation detector. The strength of the gamma radiation penetrating the pipe and slurry depends on the density of the medium in its path. The attenuation of the gamma radiation by the pipe walls can be zeroed out so that the strength of the detected radiation varies with the density of the slurry. The density of the slurry varies with its solids concentration. Therefore, the gamma ray densitometer can be calibrated to give an electrical signal directly proportional to the slurry concentration. A densitometer of this type is manufactured by Industrial Nucleonics, Accuray Division.

The density of a slurry is related to the spatial concentration by $$C = \frac{\rho_m - \rho_e}{\rho_s - \rho_e}$$

where

C = slurry spatial concentration
$\rho_m$ = slurry density measured by densitometer
$\rho_e$ = liquid vehicle density
$\rho_s$ = solids density On a vertical run of pipe 10 is located a transport concentration detector 30. It is preferably located just downstream of a pumping station. The transport concentration detector is identical to the spatial concentration detector. The spatial concentration signal from spatial concentration detector 20 is taken via electrical lead 40 to one input of a differential unit 50. The transport concentration signal from transport concentration detector 30 is communicated via lead 42 to a second input of the differential unit 50.

Differential unit 50 has two inputs 52 and 54 that communicate with leads 40 and 42 respectively. Differential unit 50 may typically be any differential amplifier of conventional design. For example, a Hewlett-Packard Solid-State Wide Band Differential Amplifier, Model 2470A.

The output of the differential unit 50 is communicated via lead 70 to the input of motor control unit 80. Motor control 80 is of conventional design and is adapted to control the speed of pump 16 in accordance with the output of differential unit 50. For example, a servo motor controlling the throttle of a diesel engine driving a positive displacement piston pump.

Figure 2:
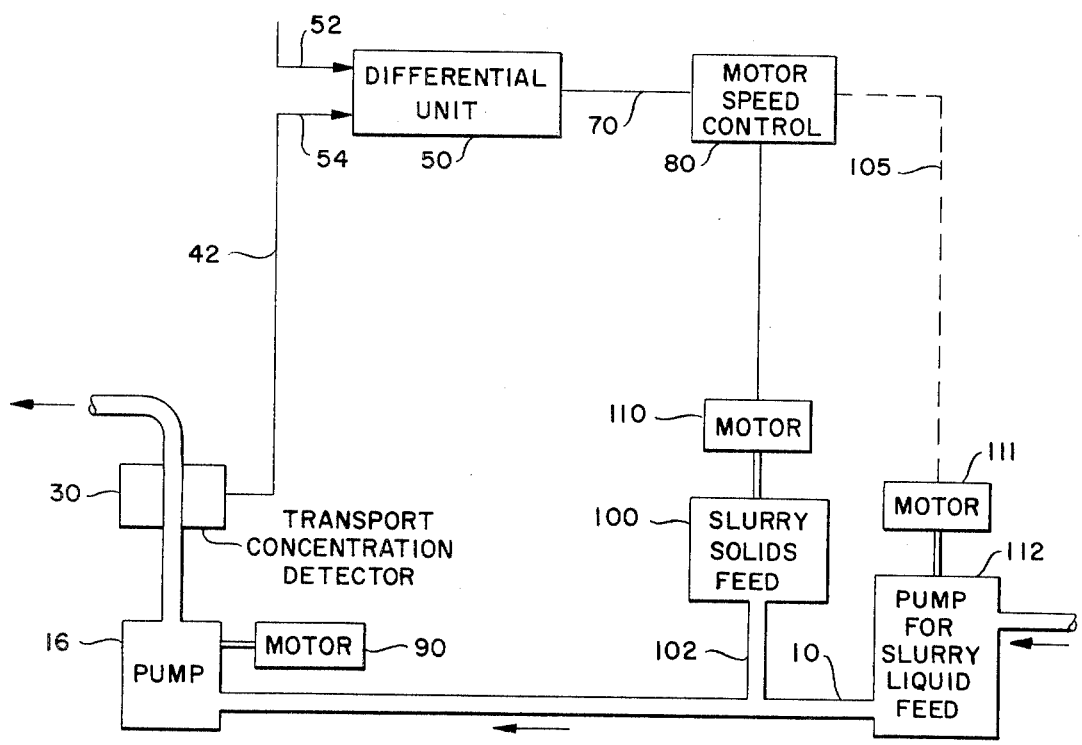
FIG. 2 illustrates a second embodiment of the invention based on control of the slurry solids feed, or slurry liquid feed.

Referring now to FIG. 2, an alternative embodiment is illustrated. A slurry liquid feed from a tank, not shown, is supplied to a pipeline 10. Solid material from a solids feed 100 is supplied to and mixed with the liquid feed at point 102. The apparatus for supplying the solids feed may take on any one of a number of configurations. For example, a conveyer belt or screw feed are satisfactory. It is important only that the rate of feed may be controlled by a motor attached thereto. To this end, motor 110 is provided to drive slurry solids feed 100. A motor speed control unit 80 is provided and is adapted to control the speed of the motor 110 in response to an output signal from differential unit 50.

Downstream of the confluence of the slurry liquid feed and slurry solid feed will be found several pumps to maintain a desired velocity of slurry flow. The first pump in this series is shown in FIG. 2 at 16. Pump 16 is provided with a motor 90 that is operated at a constant speed. Downstream of pump 16 and in a vertical run of pipe is located transport concentration detector 30. An output signal proportional to the transport concentration is communicated via lead 42 from transport concentration detector 30 to input 54 of differential unit 50. Input 52 to differential unit 50 is manually controlled and is predetermed to establish a given transport concentration.

A further alternative embodiment would find motor speed control 80 controlling the amount of slurry liquid feed supplied to pipeline 10. In FIG. 2, this is illustrated by dotted line 105 connecting motor speed control 80 with a motor 111 driving a pump for slurry liquid feed 112.

Referring again to FIG. 1, spatial concentration detector 20 supplies a signal proportional to the spatial concentration of the slurry flowing through pipeline 10. Likewise, transport concentration detector 30 supplies an output signal proportional to the transport concentration of the slurry flowing in pipeline 10. These two signals are communicated via electrical leads 40 and 42 respectively to inputs 52 and 54 respectively of differential unit 50. Differential unit 50 in turn supplies an output error signal proportional to the difference in the two input signals. Thus when the spatial concentration and transport concentration are equal, a zero error signal results. The error signal is in turn supplied to motor speed control 80 which is capable of accurately controlling the speed of motor 90. The presence of an error signal causes the motor speed control unit 80 to increase the power supplied to motor 90 which in turn increases the power supplied by pump 16 to the slurry whose velocity is thereby increased.

The foregoing method may be used to control the velocity of any slurries. By way of example, some slurry liquids would be: water, crude oil, refined hydrocarbon liquids, and other organic liquids. Solids could include coal, iron ore, sulfur, wood chips, and potash.

I claim as my invention:

1. In a method of transporting a slurry in a pipeline at the minimum stable velocity, wherein the slurry is forced through the pipeline by pumps, the steps of:
   measuring the spatial concentration of said slurry;
   measuring the transport concentration of said slurry;
   generating an error signal proportional to the difference in said spatial concentration and said transport concentration; and
   applying said error signal to said pumps to control the speed thereof.

2. The method of claim 1 wherein measuring the spatial concentration is done at a substantially horizontal portion of said pipeline.

3. The method of claim 1 wherein the transport concentration is measured immediately downstream of a pump.

References Cited
UNITED STATES PATENTS

| | | | |
|---|---|---|---|
| 2,627,788 | 2/1953 | Staege | 137—4 XR |
| 3,004,544 | 10/1961 | Guptill | 137—91 XR |
| 3,027,756 | 4/1962 | Head | 137—92 XR |
| 3,106,933 | 10/1963 | Kloppel | 137—92 XR |
| 3,380,463 | 4/1968 | Trethewey | |

R. G. NILSON, Primary Examiner

U.S. Cl. X.R.

137—4, 92; 417, 34, 53, 900